United States Patent [19]

Adell

[11] Patent Number: 4,709,525
[45] Date of Patent: Dec. 1, 1987

[54] MOLDING FOR AUTOMOBILE BODY PANELS, SUCH AS DOORS

[75] Inventor: Robert Adell, Sunnyvale, Tex.

[73] Assignee: U.S. Product Development Company, Sunnyvale, Tex.

[21] Appl. No.: 932,778

[22] Filed: Nov. 19, 1986

[51] Int. Cl.[4] .................. E04F 19/02; B60R 13/04; B60R 19/42
[52] U.S. Cl. .................. 52/718.1; 293/128
[58] Field of Search .................. 52/717.1, 718.1, 716; 24/293, 294, 295, 297, 289; 293/128

[56] References Cited

U.S. PATENT DOCUMENTS

| 2,297,887 | 10/1942 | Hall | 52/718.1 |
|---|---|---|---|
| 2,786,249 | 3/1957 | Poupitch | 52/717.1 |
| 3,059,739 | 10/1962 | Cochran | 52/718.1 |
| 3,103,265 | 9/1963 | Meyer | 52/718.1 |
| 3,127,965 | 4/1964 | Weisenberger | 52/718.1 |
| 3,279,011 | 10/1966 | Flora | 24/297 |
| 3,290,082 | 12/1966 | Fritsch | 292/128 |
| 3,451,709 | 6/1969 | Swauger | 293/128 |
| 3,606,433 | 9/1971 | Kunevicius | 52/718.1 |
| 3,861,110 | 1/1975 | Bartlett | 52/718.1 |
| 3,916,055 | 10/1975 | Wagner | 52/716 |
| 3,991,537 | 11/1976 | Brown | 52/717.1 |
| 4,011,635 | 3/1977 | Meyer | 52/718.1 |
| 4,066,285 | 1/1978 | Hall | 293/128 |

FOREIGN PATENT DOCUMENTS 477795 11/1974 Australia .................. 293/128

Primary Examiner—John E. Murtagh
Attorney, Agent, or Firm—Rhodes and Boller

[57] ABSTRACT

A body side molding for the exterior of an automobile body comprises an inner part disposed against the body and an outer part which attaches to the inner part. The inner part has non-metallic insulating material disposed as a layer between the inner part and the vehicle body to insulate the metal of the inner part from the vehicle body. It is also formed with channels along its longitudinal marginal edges, and the outer part has complementary channels along its marginal edges which provide for its attachment to the channels of the inner part. Various decorative patterns may be imparted to the outer part by the selective application of non-metallic material to the exterior surface of the outer part.

6 Claims, 11 Drawing Figures

MOLDING FOR AUTOMOBILE BODY PANELS, SUCH AS DOORS

BACKGROUND AND SUMMARY OF THE INVENTION

This mechanical invention relates to moldings which are mounted on the outside of automobile body panels, such as doors. The moldings may also be mounted on other body panels of an automobile, such as fenders, and quarter panels, by way of example.

Applicant's U.S. Pat. No. 4,434,598, dated Mar. 6, 1984, discloses a new and unique form of decorative molding comprising a combination of metal, such as stainless steel for example, and a non-metallic material, such as vinyl plastic for example. The embodiments of decorative moldings disclosed in that patent comprise the non-metallic material forming a protective insulating layer between the metal of the molding and the underlying portion of the vehicle body panel against which the molding is disposed. The moldings are formed from a strip of metal, onto one side of which the non-metallic material has been applied, into cross sectional shapes which include insulated beads formed along the longitudinal margins of the strip by turning the longitudinal marginal edges onto the side of the metal strip opposite the side containing the non-metallic material. The moldings are further formed with a main body between the insulated beaded longitudinal marginal edges, and this main body is set outwardly in relation to the automobile body panel enabling the molding to present an appearance of substantial cross sectional size even though it is formed simply from a metal strip.

The present invention relates to a new and improved molding which like the moldings of U.S. Pat. No. 4,434,598 is insulated from the underlying vehicle body panel by a layer of non-metallic material. The present invention is a further improvement in moldings in that it provides more opportunities for color coordination with various colors of automobiles. It also possesses new and unique constructional features.

These, along with additional features, advantages, and benefits of the invention, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
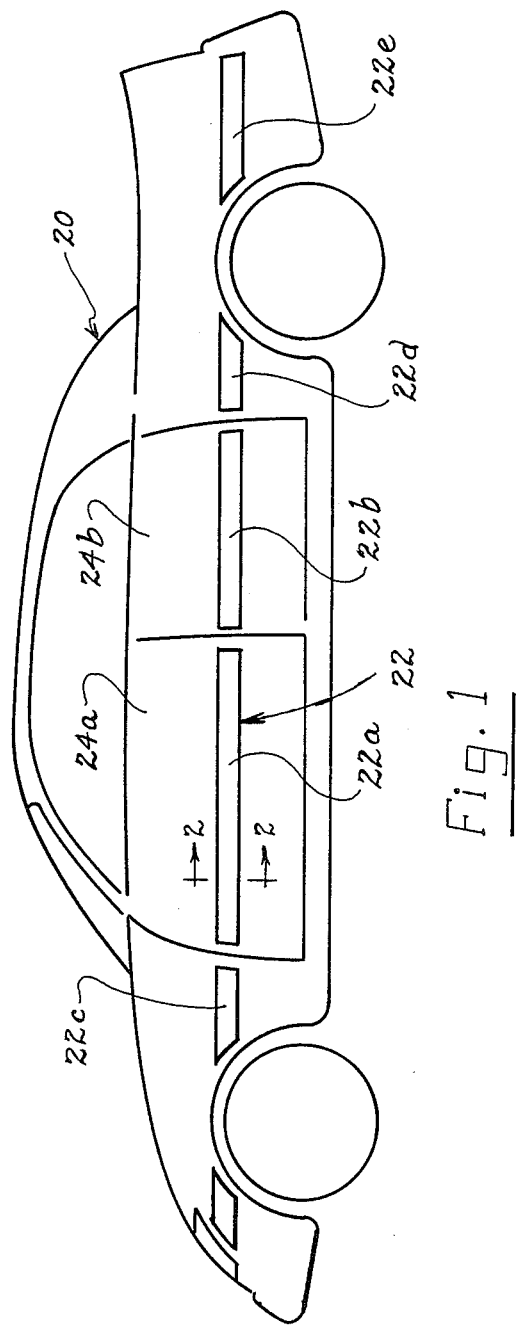
FIG. 1 is a side elevational view of an automobile containing decorative moldings representative of principles of the present invention.

FIG. 1 shows a representative automobile 20 which contains a decorative molding 22 according to the present invention. The illustrated molding comprises two principal parts 22a, 22b, on the respective front and rear doors 24a, 24b respectively, and additional molding parts 22c, 22d and 22e mounted on adjacent body portions. Specifically, the molding part 22c is mounted on the fender rearwardly of the wheel well and the molding parts 22d, 22e are mounted on the quarter panel, forwardly and rearwardly, respectively, of the rear wheel opening.

The molding 22 forms a styling feature for the automobile and it may also provide a certain protective function if it is impacted by external forces which would otherwise directly impact the underlying body.

It is to be appreciated that the illustration of FIG. 1 is merely representative and that the scope of the invention is not to be limited by the number of individual parts forming a particular molding nor their exact location on the vehicle body.

Figure 2:
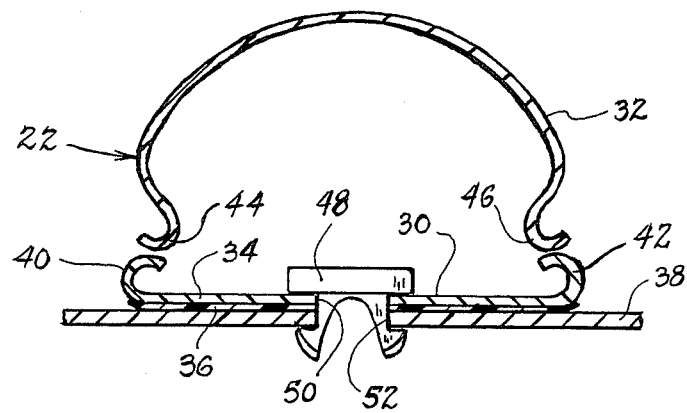
FIG. 2 is an enlarged transverse cross sectional view taken in the direction of arrows 2—2 in FIG. 1, but illustrating the component parts in non-assembled relationship.
Figure 3:
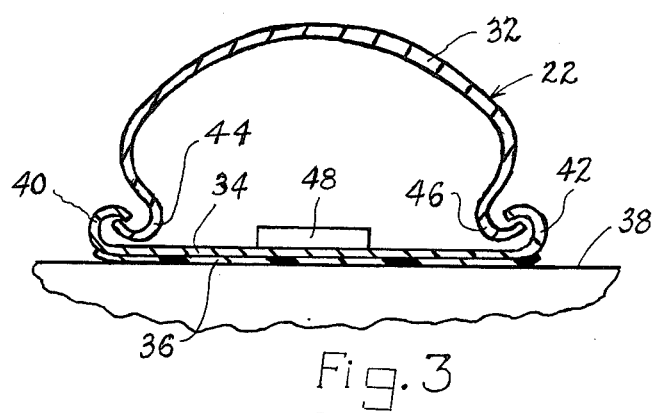
FIG. 3 is a view similar to FIG. 2 illustrating the parts in assembled relationship.

Referring to FIGS. 2 and 3, each molding part is itself essentially a two-part construction comprising an inner part 30 and an outer part 32. The two parts 30 and 32 are elongate strips formed to particular cross sectional shapes. Inner part 30 comprises a metallic body 34 formed from metal strip material and an insulating layer 36 formed from non-metallic insulating material such as vinyl plastic (PVC).

Layer 36 is disposed as a backing for inner part 30 to form an insulating layer between body 34 and the underlying vehicle body panel 38. In the examples of FIGS. 2 and 3, the inner part 30 is disposed essentially flat against the underlying body panel 38, and the non-metallic material 36 forms an insulating layer along the full extent of what would otherwise be direct contact of the metal body 34 with panel 38. This feature is especially advantageous because it greatly attenuates the potential for corrosive action occurring between the metal 34 and the panel 38. Depending upon thickness, layer 36 can also provide a certain protective cushioning function which will be a function of thickness and durometer of the particular material for the plastic.

The longitudinal marginal edges of part 30 are curled inwardly on the side of the strip opposite the backing layer 36. As such, they form confronting channels 40 and 42 which face each other across the central region of part 30.

The outer part 32 is adapted to attach to the inner part 30 via channels 40 and 42. For this purpose the marginal longitudinal edges of outer part 32 are formed into outwardly facing channels 44 and 46 respectively which are adapted to cooperatively fit with channels 40 and 42 respectively in the manner shown in FIG. 3. The attachment can be accomplished by aligning the two parts and then sliding them together endwise, or alternatively, by engaging one of the channels, say 44, with the corresponding channel 40 and then flexing the outer part to allow the other two channels 46 and 42 to be connected with each other in a sort of snap-in manner.

Since the two individual parts 30, 32 of the molding 22 are typically elongate, at least several points of attachment along the length to the underlying body panel 38 will be typically required. One way to do this is by means of a series of fasteners 48 at periodic intervals. In the illustrated embodiment circular holes 50 are provided in inner part 30 centrally located with respect to the width of the part, and the vehicle body panel is provided with a corresponding pattern of holes 52. Hence, when the holes 50 are registered with the holes 52 after the inner part only has been placed against the panel 38, the fasteners 48 can be passed through the aligned holes to secure the inner part to the body panel. Afterwards the outer part 32 is assembled in either of the two aforedescribed manners.

Alternatively it is possible for the molding 22 to be assembled to the body panel without the use of separate fasteners, by a suitable adhesive, cement, or bonding agent disposed between the plastic layer 36 and the body panel. With this sort of attachment the outer part 32 can be preassembled to the inner part 30, before the molding is adhered to the body. With the described procedure using fasteners 48, the finished molding assembled to the vehicle entirely conceals the fasteners 48 so that only the decorative appearance of the molding is presented to view.

The outer part 32 is formed to any desired cross sectional shape and the illustrated example is one in which the central region of the outer part presents a convex external shape. Therefore, the finished molding presents a substantial appearance essentially of bright decorative metal.

The plastic material 36 may be made colored or non-colored. As a precaution, at least some of the material of the plastic should curl slightly around onto the channels 40 and 42 as shown in FIGS. 2 and 3. Even if the plastic is colored, it is anticipated that a small amount of material will not be objectionable from an appearance standpoint; however, certain appearance features can be created by extending colored material more fully around onto the channels 40 and 42 as desired. The important consideration is that there be plastic between the metal body 34 of part 30 and the body panel 38.

Figure 4:
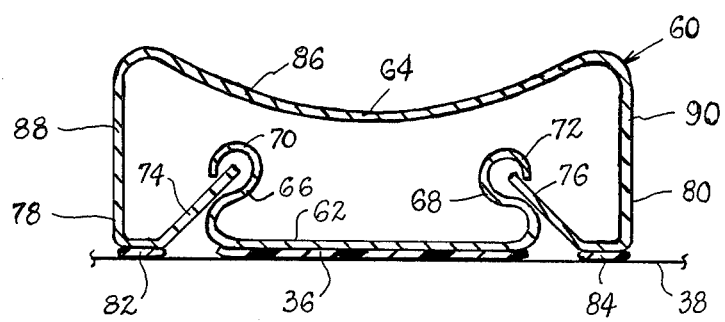
FIGS. 4–8 are views similar to FIG. 3 illustrating further embodiments.

FIG. 4 illustrates a further embodiment 60 which still contains the generic aspects of the present invention but which has the marginal edge portions of the inner and outer parts 62, 64 formed in different configurations. More particularly, the embodiment of FIG. 4 has "S" shaped formations 66, 68 which comprise outwardly open channels 70, 72 for reception of the edges 74, 76 of the outer part's channels 78, 80 in the manner shown in FIG. 4.

Further features of embodiment 60 are that the outer part's channels 78, 80 are also disposed in contact with body panel 38 along zones which are spaced outwardly from the margins of inner part 62, and the outer part 64 comprises non-metallic insulating material 82, 84 (i.e., PVC) disposed at these zones to insulate the metal of outer part 64 from body panel 38. In this embodiment the inner part is entirely concealed by the outer part. It also illustrates a different shape in which the outer part has an outwardly concave central region 86 which is spaced from the vehicle body by parallel sides 88 and 90. The appearance presented is that of bright shiny metal since there is no non-metallic plastic material disposed on the exterior of the outer part.

Figure 5:
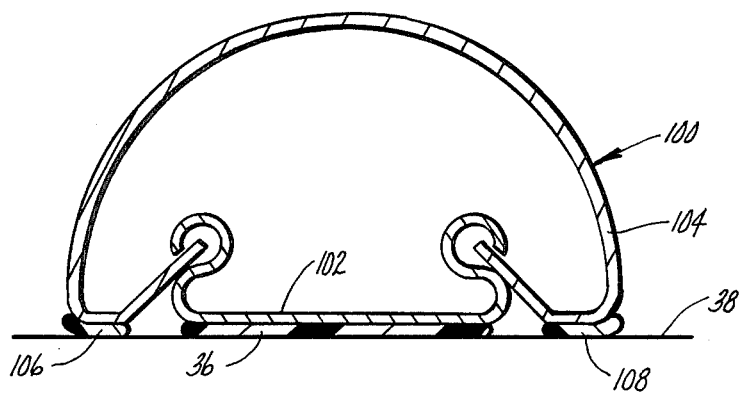

FIG. 5 illustrates another embodiment 100 in which the inner part 102 is essentially the same as the inner part 62 of FIG. 4. The outer part 104 differs in that it has a generally semi-circular shape and serves to essentially entirely conceal the inner part 102. Insulating material 106, 108 is disposed on the channels of outer part 104 at zones where the metal of the outer part would otherwise contact the body panel 38.

Figure 6:
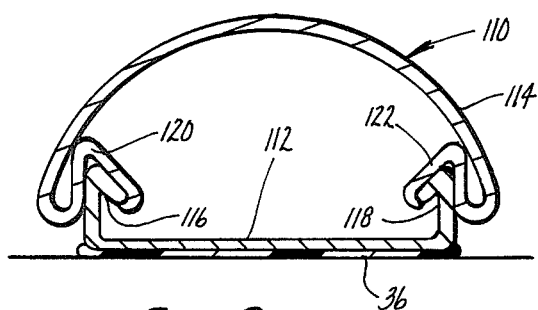

FIG. 6 illustrates another embodiment 110 in which the outer part 114 has a generally semi-circular shape but is spaced from the body panel so as to be in non-contacting relationship with the body panel. The shapes of the channels 116, 118 on inner part 112 and the channels 120, 122 on outer part 114 also have different configurations from previous embodiments, as is apparent from the drawing figure.

Figure 7:
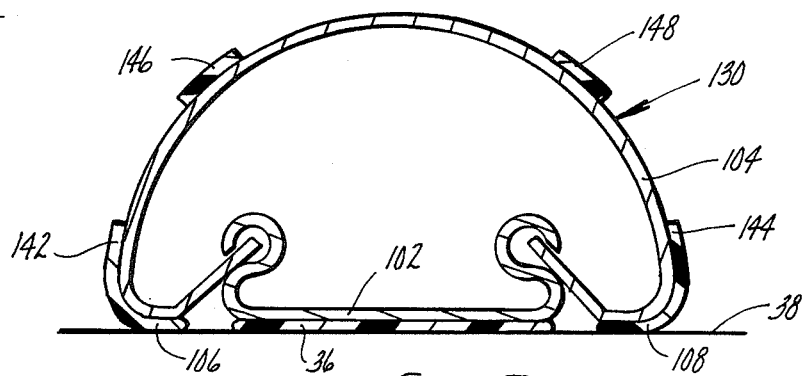
Figure 8:
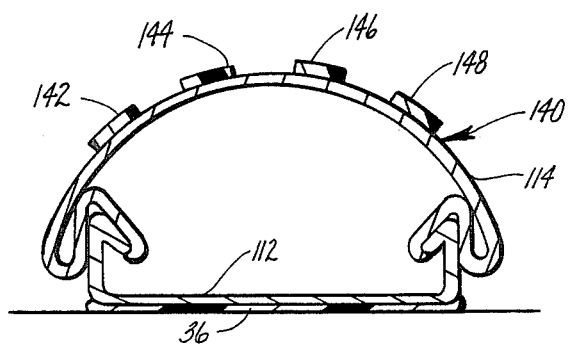

FIGS. 7 and 8 are additional embodiments 130, 140 which are essentially the same as the embodiments of FIGS. 5 and 6 except for the presence of additional non-metallic material selectively disposed at 142, 144, 146, 148 on the parts so that the parts present a different decorative appearance from that of solely bright shiny stainless steel. The non-metallic material may be colored for particular color coordination with the underlying vehicle body and the locations at which the material is applied to the exterior surface of the parts is chosen to present a desired styling appearance. The illustrated embodiments are simply representative. In any of the embodiments, the non-metallic material may be selectively applied at particular locations and in particular colors for decorative purposes and color coordination purposes.

The moldings which have been described in the preceding embodiments are formed by using known manufacturing techniques. Each inner and outer part may be formed from metal strip of appropriate width to which the non-metallic material is selectively applied in the desired manner. The process may be performed on a continuous basis by passing the metal strip through an extruder which extrudes the plastic material as a layer onto the metal. Afterwards, the insulated metal strip may be formed by conventional techniques such as roll forming, for example, to the illustrated cross sectional shape. Where mechanical fasteners are used, as in the manner of FIG. 2, holes may be created in the inner part. The molding is cut to a desired length in accordance with the particular design for the body on which it is to be mounted.

Since the end of the two assembled inner and outer parts will be open, it will typically be desirable to have closures for these ends.

Figure 9:
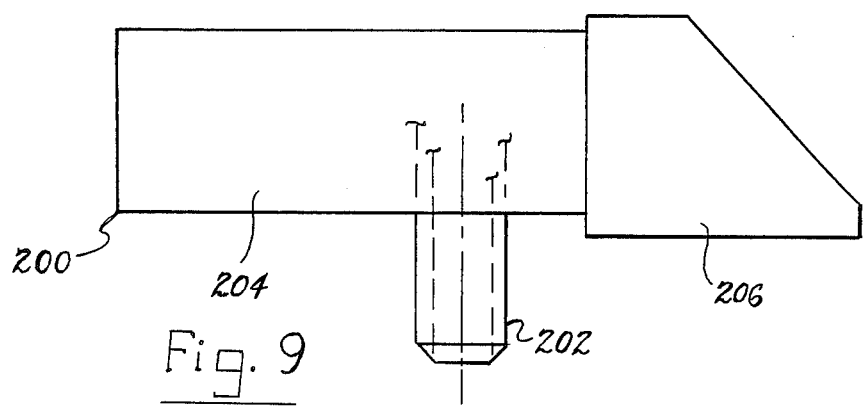
FIGS. 9–11 are elevational views of different embodiments of additional portions of the moldings.
Figure 10:
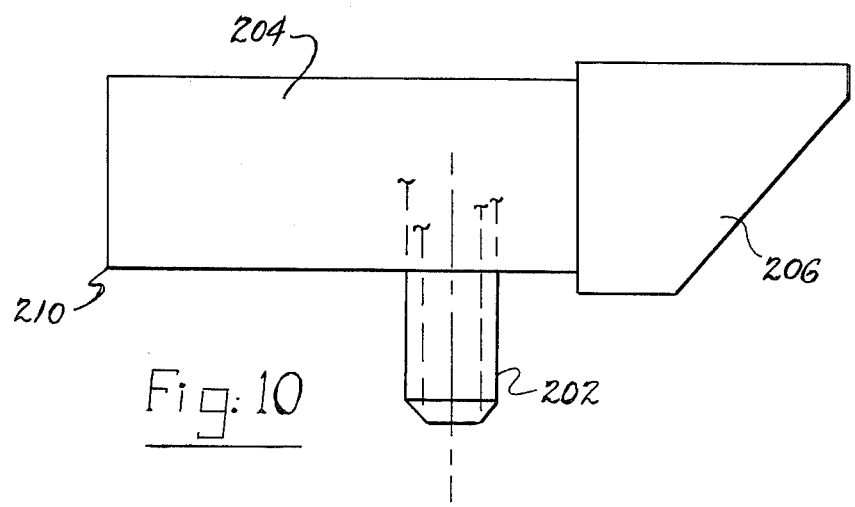
Figure 11:
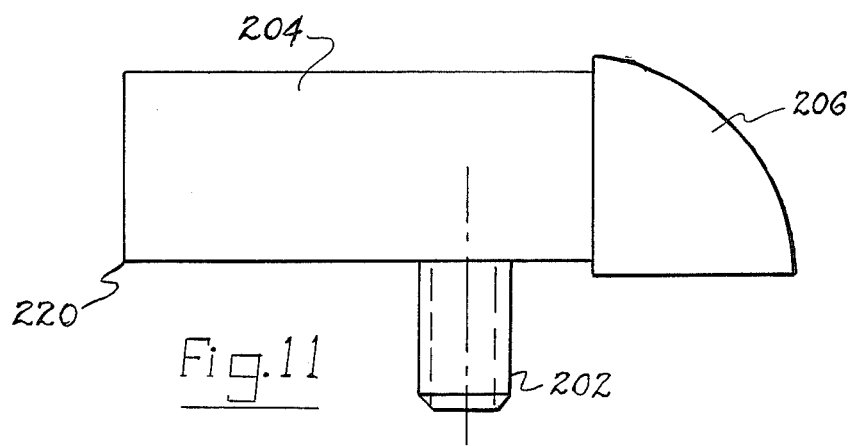

FIGS. 9, 10 and 11 portray three respective embodiments of closures 200, 210, 220, each of which includes a mounting stud 202 which is adapted to pass through a hole in the panel to which the molding is to be attached. The illustrated enclosures are preferably formed by an injection molding process wherein the ends of the molding are placed in a suitable die of an injection molding machine and plastic is injection molded onto the ends. In this regard the interior portion 204 of each closure which fits into the end of the molding will have a shape essentially corresponding to that of the opening at the end of the molding into which it is molded. The particular shape of end which forms the exterior portion 206 of the closure will have a shape depending upon the particular location where the molding is attached to the vehicle body. In this regard, the embodiment of FIG. 9 is cut one way, the embodiment of FIG. 10 is cut the other way and the embodiment of FIG. 11 is rounded off.

The foregoing described embodiments of molding are merely representative of principles of the invention. Various specific embodiments are contemplated within the scope of the invention.

What is claimed is:

1. In combination with the exterior surface of a vehicle body panel, such as a door, a decorative molding comprising an inner elongated metal part having a central portion and longitudinal marginal edge portions bounding said central portion, said central portion being disposed against the vehicle body panel and non-metallic means attaching said central portion to the vehicle body panel, a layer of non-metallic insulating material extruded onto the surface of said central portion disposed against the vehicle body panel such that said layer is disposed between said inner part and said body panel to insulate the metal of the inner part from the body panel, and an outer elongated metal part comprising a central portion bounded by longitudinal marginal edge portions, said longitudinal marginal edge portions of said inner and outer parts comprising mutually interlocking channels via which the outer part attaches to the inner part, the channels of said inner part facing away from each other, the outer part being constructed and arranged in relation to the inner part such that the outer part fully conceals the inner part and includes body-confronting portions of its own channels disposed to confront the body panel, and non-metallic insulating material extruded as a layer onto respective surfaces of the respective body-confronting portions of the channels of said outer part disposed against the body panel such that said last-mentioned layer insulates the metal of said outer part from the body panel, and in which said mutually interlocking channels are constructed and arranged such that the channels of said inner part are spaced outwardly away from the body panel, and free edge portions of the channels of said outer part are disposed contiguous said body-confronting portions and project away from the body panel to be received into the channels of said inner part.

2. The combination set forth in claim 1 including non-metallic insulating material extending from said body-confronting portions onto the exterior surface of the central portion of said outer part.

3. The combination set forth in claim 1 including non-metallic insulating material selectively applied to the exterior surface of the central portion of said outer part.

4. The combination set forth in claim 1 in which said attaching means comprises apertures in the central portion of said inner part and non-metallic fastening means extending through said apertures and into registering apertures in the body panel providing for the attachment of the inner part and wherein the outer part is so constructed and arranged as to conceal the fastening means from view.

5. The combination set forth in claim 1 in which the outer part has its central portion spaced from the inner part so as to be in a non-contacting relationship to the inner part.

6. The combination set forth in claim 1 including an end closure at at least one of the ends of the molding which comprises an interior portion fitting into the interior space cooperatively defined between the inner and outer parts of the molding.

* * * * *